United States Patent

[11] 3,618,860

[72] Inventors Arthur R. Parilla
Mountain Lakes, N.J.;
Howard D. Thompson, West Lafayette, Ind.
[21] Appl. No. 695,309
[22] Filed Dec. 22, 1967
[45] Patented Nov. 9, 1971
[73] Assignee The United States of America as represented by the Secretary of the Navy

[54] ROCKET ENGINE NOZZLE
6 Claims, 3 Drawing Figs.
[52] U.S. Cl. .................................................. 239/265.11, 60/271
[51] Int. Cl. .................................................. B63h 11/00, B64d 33/04
[50] Field of Search ....................................... 239/265.11, 127.1, 127.3; 60/253, 271

[56] References Cited
UNITED STATES PATENTS
3,012,400 12/1961 Corson, Jr. ................... 239/265.11

Primary Examiner—Samuel Feinberg
Attorneys—R. S. Sciascia and J. A. Cooke

ABSTRACT: A plug nozzle for rocket engines wherein the danger of nozzle failure due to particle impingement on the plug surface when metallized solid propellants are utilized is eliminated without effecting desirable design characteristics by the provision of a double corner for Prandtl-Meyer expansion, the angle at the cowl lip corner being reduced and supplemented by a second corner formed in the plug itself at the throat section of the nozzle.

PATENTED NOV 9 1971　　3,618,860

ROCKET ENGINE NOZZLE

BACKGROUND AND SUMMARY OF THE INVENTION

This invention relates generally to plug nozzles for rocket engines and more particularly to a plug nozzle for a rocket engine utilizing a metallized particle loaded propellant.

Recently, important advances have been made in the state of the propellant art. One such development has involved the discovery that the burning characteristics of solid propellants can be improved by the introduction of aluminum particles, and many of the propellant manufacturers have turned to the production of this metallized particle-loaded type of propellant.

The utilization of such metallized particle-load propellants with the plug nozzles heretofore known and used has so far met with serious problems. Tests with the conventional plug nozzle have shown that the employment of metallized propellants subjects the nozzle to rapid and catastrophic failure.

Plug nozzles employ concentric plug and cowl arrangements. Conventional plug nozzle design is based upon principles of gas dynamics. The cowl is constructed with an inturned lip at its aft end. The gas products of combustion expand around the corner of the lip to form their own free-flow outer boundary with the surrounding environment, the angle through which the gas turns being known as the Prandtl-Meyer angle of expansion.

In order to provide maximum thrust efficiency, the nozzle plug, lying in the center of the jet stream is formed with an isentropic contoured surface to correspond to a gas streamline in Prandtl-Meyer expansion about the corner of the cowl lip.

In designing thrust engines, it has proven particularly advantageous to construct the nozzle so that the outer boundary of the gas stream at design altitude is parallel to the nozzle axis of symmetry. This has been accomplished in the past by configuring the cowl lip so that the angle it forms with the axis is equal to the Prandtl-Meyer angle of expansion at design altitude.

Experiments with the aluminum loaded propellants have shown that two-phase expansion flow results. The metal particles form metal oxides during combustion. At the equilibrium temperature of the products of combustion the metal oxides remain in the liquid state as micron-size droplets. In some instances the liquid phase comprises as much as 40 percent of the total mass flow. These liquid particles having a greater density than the gas phase of the flow, are not able to turn the corner of the cowl lip with the same radii of curvature as the gas streamlines, but rather, cut across the gas streamlines striking the isentropic streamlined surface of the plug. This high velocity impingement of the plug by the liquid phase of the flow, causes the critical area of the plug to heat up rapidly with the aforementioned failures being the result.

It is a specific object of the instant invention to provide a plug nozzle which can be used with aluminum loaded and other metallized propellants yielding two-phase expansion flow without danger of failure due to impingement of the plug surface by the liquid phase of the flow.

Briefly and generally, these and other objectives are accomplished in accordance with the invention by the provision of a second corner for Prandtl-Meyer expansion on the plug itself in the throat section of the nozzle. The angle of the cowl lip is reduced so that the liquid phase of the expansion flow is discharged more nearly in the propulsive direction. Whereas, in the conventional plug nozzle, the liquid particles must turn to avoid hitting the plug, in the new concept described herein, they will hit the plug only if they do turn. Thus, the inertia of the particles is now utilized to prevent impingement.

Among the advantages inherent in the instant invention in addition to the advantages realized by reason of the elimination of particle impact on the plug are the following:

Increased overall propulsive efficiency due to initial discharge of the two-phase flow more directly in the propulsive direction.

Increased off-design performance with high nozzle thrust coefficients at pressure ratios below the design value thereby compensating not only for altitude changes but also for the use of a rocket motor operating at two (or more) pressure levels.

Substantial reduction in cowl maximum diameter.

Easier assembly of the plug with the cowl.

Simplified manufacturing procedures due to precise control of location and inclination of the geometric throat by means of simple tooling fixtures.

Reduction of pressure forces on the plug thereby reducing stresses in the plug support structure.

Less sensitivity to deformation of the primary structure under operating stresses.

BRIEF DESCRIPTION OF THE DRAWINGS

Having summarized the invention, a detailed description follows with reference being had to the accompanying drawings which form a part of this specification, of which.

DETAILED DESCRIPTION

Figure 1:
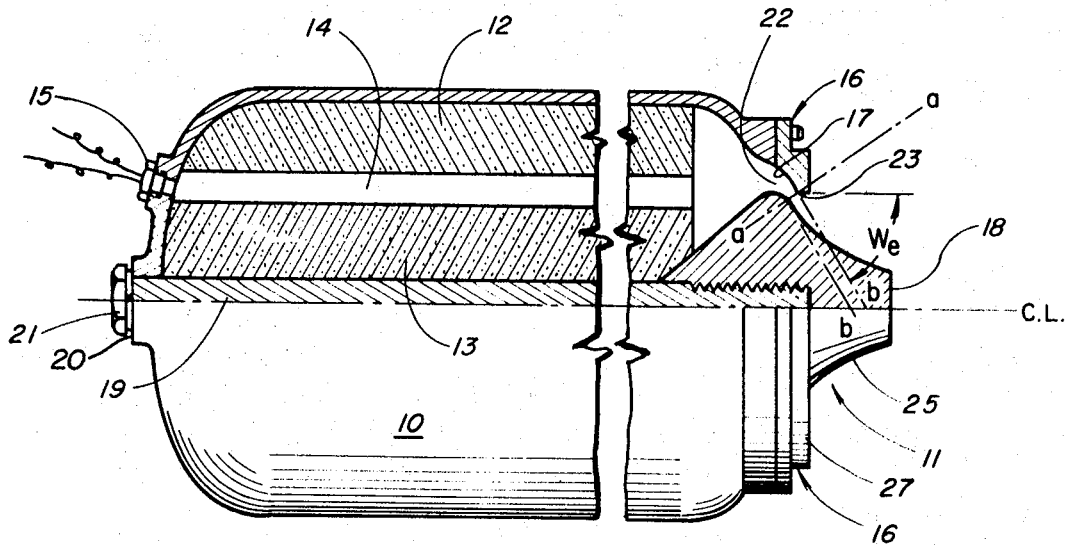
FIG. 1 is an elevational view partially in longitudinal section of a conventional solid propellant rocket engine embodying the prior art plug nozzle configuration.

Before proceeding with a detailed description of the invention, it is advantageous to include a more detailed description of a prior art plug nozzle by referring to FIG. 1 of the accompanying drawings. A conventional rocket structure is shown therein including an outer cylindrical rocket case 10, having a heat-insulating liner (not designated), to which the plug nozzle assembly, designated generally at 11, is attached. The solid propellant is in the form of an outer tube, 12, and central rod, 13, whose concentric relationship defines an annular passageway 14 thru which the products of combustion flow in the aft direction towards nozzle assembly 11. Combustion occurs on the inner surface of the tube 12, and on the outer surface of the rod 13 and is initiated by the igniter 15. The plug nozzle assembly 11 includes a cowl member 16, having an internal surface 17, formed to provide the desired angle, $W_e$, with respect to the centerline or axis C.L. of the engine. The angle $W_e$, which is chosen for design purposes to be equal to the Prandtl-Meyer angle of expansion, may be computed in accordance with thermodynamic and gas dynamic theory, and is chiefly a function of the ratio of the external ambient pressure to the internal chamber pressure for the desired design condition, all of which is well known in the art. A typical angle for $W_e$ is 60°. A plug 18 is supported by a tie rod 19, threaded at its aft end to the plug 18, as shown, and passing through the forward head closure 20 to be retained by the nut 21. The plug 18 is formed to provide in conjunction with cowl 16 a subsonic annular approach section as shown at 22 in which the flow is directed radially inward. The minimum flow area occurs at the throat section $a—a$ where the gases reach sonic velocity. The flow then undergoes Prandtl-Meyer expansion about the corner 23 at the cowl lip, forming a jet boundary 24 which, at design condition, is parallel to the centerline C.L. as will be understood. Beyond the throat section $a—a$, the plug is contoured to form an isentropic surface 25 as shown. The contour of surface 25 coincides with the gas streamline in the flow emerging from the throat and may, therefore, be computed in accordance with well-known gas dynamic theory.

When the propellant contains metal additives, such as aluminum powder, the chemical reaction during combustion yields aluminum oxide which condenses to the liquid state at the equilibrium combustion temperature of the products of combustion. The condensate forms micron-sized liquid aluminum oxide particles which are entrained in the gas phase. When the two-phase flow reaches the throat section a—a, only the gas phase obeys the Prandtl-Meyer flow laws, the liquid phase following Newton's Laws of Motion. Because of the relatively high density of the liquid particles, their inertia prevents them from turning the cowl lip corner with the same small curvature as the gas streamlines, this particle angular lag causing their trajectories to cut across the streamlines with the result that particle impingement on the isentropic surface 25 is inevitable. In fact, the liquid particle trajectories tend to remain within the general confines of the throat area projection represented by the lines b—b, and as can clearly be seen in FIG. 1, the throat projection b—b intersects the plug isentropic surface 25 in a region close to the throat. Early tests with conventional plug nozzles have resulted in catastrophic failure of the plug (or spike, as frequently called) within a very few seconds after ignition.

Figure 2:
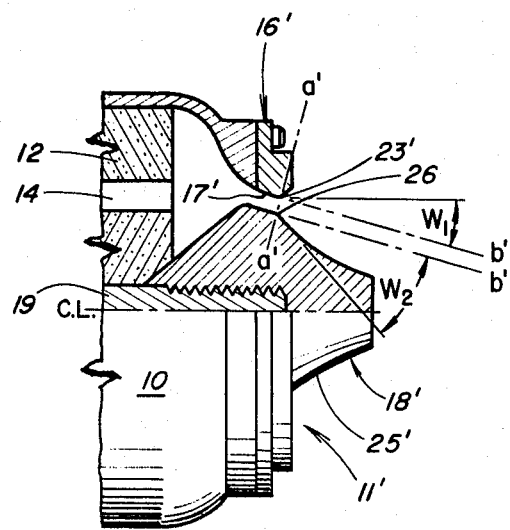
FIG. 2 is a fragmented elevational view partially in longitudinal section of the aft end of a conventional rocket engine as in FIG. 1, in which the conventional plug nozzle is replaced by an improved plug nozzle embodying the principles of the instant invention.

The fundamental principles of the instant invention by which the foregoing problem is obviated are embodied in the nozzle of FIG. 2. All elements of the rocket engine are the same as FIG. 1, except that the concept of a double-cornered plug nozzle is introduced. In addition to the corner 23' normally found on the cowl 16', a second corner twenty six is formed on the plug 18' itself opposite cowl corner 23' to define the minimum flow or nozzle throat area $a'—a'$.

The total turning angle $W_e$ is divided into two portions with partial turning occurring at each corner. From application of gas dynamic theory, the following relation for optimum design is obtained $$W_1 + 2W_2 = W_e \qquad (1)$$

where $W_1$ = the angle at the cowl corner 23' formed by the inner cowl surface 17' and the nozzle axis and $W_2$ = the angle at the plug corner 26 formed by the isentropic plug surface 25' and the subsonic plug surface. As will be obvious to those skilled in the art, $W_e$ is an independent variable and $W_1$ is a matter of choice of the designer. In this case, the jet boundary leaves the cowl corner at a divergent angle which later converges. A modified isentropic surface 25' is required following the corner 26 on the plug. The contour of surface 25' may be determined by a computer program applying the well-known Method of Characteristics for analyzing supersonic flow fields.

From FIG. 2 it is readily apparent that the provision of a double-corner for Prandtl-Meyer expansion enables the plane of the throat section, $a'—a'$, *to extend in a direction more nearly normal to the nozzle axis. The projection of the throat area downstream, lines $b'—b'$,* completely avoids intersection with the isentropic surface 25' of the plug. Since all liquid particles leaving the nozzle throat are confined within the boundaries b—b or $b'—b'$ by their angular lag, it is obvious that where the particles will impinge on isentropic surface 25 of FIG. 1, they will not do the same to isentropic surface 25' of FIG. 2, as turning is now required to cause impingement rather than to avoid it. Thus the new concept of the instant invention utilizes the inherent characteristic of the two-phase flow, whereby the inertia of the particles, or particle angular lag, is used to advantage.

The thrust efficiency of the double-cornered nozzle of FIG. 2 is higher than that of the conventional plug nozzle of FIG. 1 with two-phase flow, since the particles are discharged more nearly in the propulsive direction. The primary advantage, however, is that the integrity of the plug structure can be maintained.

The double-cornered nozzle concept can, of course, be readily adapted for use in a variable throat area nozzle, such as the nozzles fully described in U.S. Pat. Nos. 3,094,072 and 3,151,446. As shown therein, by relative translational displacement between the plug and the cowl, the throat area may be varied, providing a variable thrust solid propellant rocket engine. Also, as shown in the above-referenced patents, the variable throat area, in combination with appropriate combustion characteristics of the solid propellant, can provide start-stop-restart performance with solid propellant rocket engines. Briefly, this is accomplished as follows: as the throat area is increased, the chamber pressure is reduced exponentially. Since this pressure decreases more rapidly than the area increases, the thrust, which is proportional to the product of the two, also decreases. As the throat area continues to increase, the chamber pressure will drop below the threshold pressure, required by certain propellants to maintain combustion, so that the combustion process is extinguished. By returning the nozzle throat area to a propulsive position (reduced throat area), reignition can provide restart.

Experimental simulator tests have demonstrated that, when the double-cornered nozzle of the instant invention is used, the variable throat area by relative displacement between cowl and plug, provides higher nozzle efficiency in off-design condition than the conventional plug nozzle. A simple physical explanation of this observed experimental result can be made as follows.

In both nozzles the thrust produced may be expressed by
$$F = P_o A_t \cos W_1 + [\sigma P \, dA] \qquad (2)$$
on isentropic surface where $F$ = thrust, pounds, $P_o$ = chamber pressure, p.s.i.a., $A_t$ = throat area, in$^2$, $W_1$ = angle at cowl lip, $P$ = *local pressure at isentropic surface*, $dA$ = incremental area on the isentropic surface.

In the conventional nozzle, $W_1 = W_e$, and cosine $W_1$ is small. The major portion of the thrust is thus contributed by the pressure-area integral over the spike.

In the double-cornered nozzle, $W_1$ is small and cosine $W_1$ is large. Thus a much smaller portion of the thrust is contributed by the pressure-area integral over the plug. (This is obvious since the pressure reduces rapidly following Prandtl-Meyer turn at the plug corner.)

The isentropic surface provides isentropic flow only when the cowl corner is in proper geometrical relationship with the plug isentropic surface. This is the design condition. When relative displacement between cowl and plug occurs to provide the variable throat area, the original isentropic surface is no longer "isentropic" for the new cowl position relative to the plug. Thus, the pressure distribution along the spike surface is less than optimum.

Since in the conventional nozzle, the pressure distribution on the spike surface contributes a greater portion of the total thrust, it causes a greater loss in nozzle efficiency, compared to the double-cornered nozzle.

Figure 3:
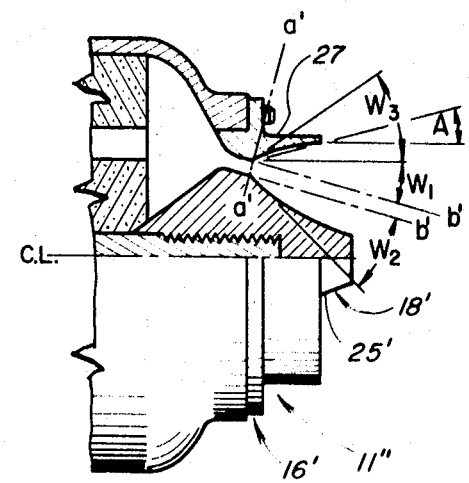
FIG. 3 is a view similar to FIG. 2 of a modified form in accordance with the invention of the improved plug nozzle of FIG. 2.

Further improvement in thrust efficiency of the double-cornered nozzle in the design condition can be made as shown in FIG. 3. In this case, the double-cornered nozzle 11'' is basically the same as shown in FIG. 2, with the addition to the cowl structure 16' of a supersonic shroud 27 downstream of the throat section $a'—a'$. *This shroud 27 provides more gradual expansion of the flow downstream of cowl corner 23' with pressure forces acting on the shroud internal surfaces to provide some additional thrust. The initial angle of the shroud structure,* $W_3$ in FIG. 3, can be found from the following relation
$$W_3 = W_1 + W_2 \qquad (3)$$

The shroud is preferably contoured as depicted to provide another isentropic surface, with a discharge angle, A, to provide minimum flow divergence losses. While discharge angle A should be made as small as possible to reduce flow divergence losses, it cannot be made too small or the shroud will become excessively long and heavy. The optimum angle would, therefore, represent a compromise between these two considerations. For structural simplicity, the inner shroud surface can have a frustoconical geometry including the same desired discharge angle, A, with only small losses.

The nozzle efficiencies for the various nozzle configurations shown in FIGS. 1, 2, and 3, were experimentally determined in laboratory tests conducted with gas flow only. The results are shown in the following table.

TEST OF NOZZLE EFFICIENCIES
[Gas flow only]

| Test series Nos. | Conditions | Percent | | |
|---|---|---|---|---|
| | | Conventional plug nozzle (Fig. 1) | Double-cornered plug nozzle (Fig. 2) | Shroud added to double-cornered plug nozzle (Fig. 3) |
| 1 | Throat area: Design condition. Pressure ratio: Design condition. | 97.6 | 92.8 | 97 |
| 2 | Throat area: Design condition (same as No. 1 series). Pressure ratio: One-third design pressure ratio. | 94.1 | 88.4 | 92.5 |
| 3 | Throat area: 150% of design throat area. Pressure ratio: Design condition (same as No. 1 series). | 85.4 | 92.8 | 91.4 |

It is to be understood that the invention is not limited to the details, parts and arrangements herein described and illustrated, but changes may be made by those skilled in the art without departing from the spirit and scope of the invention as defined in the appended claims, and without sacrificing its chief advantages.

What is claimed is:

1. A rocket engine thrust nozzle for use with a compressible working fluid having a liquid phase entrained therein comprising a cowl and a plug formed of solid material concentrically disposed within said cowl to define therewith an annular exit passageway for said working fluid terminating at a sonic throat section and including a subsonic approach section, said cowl and said plug each having a corner in opposed relation at said throat section for Prandtl-Meyer expansion of said working fluid issuing from said passageway, said plug extending downstream from said throat section in a tapered configuration, the angles of said corners being such that the projection of said throat section does not intersect the tapered surface of said plug.

2. A nozzle as defined in claim 1, wherein the angle of said cowl corner $W_1$, the angle of said plug corner $W_2$ and the Prandtl-Meyer angle of expansion $W_e$, are related in accordance with the equation $W_1 + 2W_2 = W_e$.

3. A nozzle as defined in claim 2, said cowl having an integral shroud extending downstream of said throat section, said shroud having an initially diverging inner surface serving to define an internal expansion chamber with said plug for said working fluid.

4. A nozzle as defined in claim 3 wherein the initial angle of divergence of said shroud, $W_3$, is equal to $W_1 + W_2$.

5. A nozzle as defined in claim 4, said inner surface of said shroud having an isentropic contour.

6. A nozzle as defined in claim 1, said cowl having an integral shroud extending downstream of said throat section, said shroud having an initially diverging inner surface serving to define an internal expansion chamber for said working fluid.

* * * * *